United States Patent
Wang (10) Patent No.: US 10,241,835 B2
(45) Date of Patent: Mar. 26, 2019

(54) SCHEDULING STORAGE AND COMPUTING RESOURCES BASED ON TASK TYPES AND SERVICE LEVELS

(71) Applicant: Huawei Technologies Co., Ltd., Shenzhen (CN)

(72) Inventor: Li Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 15/245,807

(22) Filed: Aug. 24, 2016

(65) Prior Publication Data

US 2016/0364269 A1    Dec. 15, 2016

Related U.S. Application Data

(63) Continuation of application No. PCT/CN2014/089540, filed on Oct. 27, 2014.

(30) Foreign Application Priority Data

Feb. 24, 2014   (CN) .......................... 2014 1 0062471

(51) Int. Cl.
   *G06F 9/50*       (2006.01)
   *G06F 9/48*       (2006.01)
   (Continued)

(52) U.S. Cl.
   CPC ............ *G06F 9/5011* (2013.01); *G06F 3/061* (2013.01); *G06F 3/0604* (2013.01); *G06F 3/067* (2013.01);
   (Continued)

(58) Field of Classification Search
   None
   See application file for complete search history.

(56) References Cited

U.S. PATENT DOCUMENTS 6,904,470 B1 *   6/2005   Ofer ...................... G06F 3/061
                                                        710/6
7,447,708 B2 *   11/2008   Hattori .................. H04L 61/15
                  (Continued)

FOREIGN PATENT DOCUMENTS

CN          1859418 A     11/2006
CN        101908972 A     12/2010
                  (Continued)

OTHER PUBLICATIONS

Machine Translation and Abstract of Chinese Publication No. CN103581339, Feb. 12, 2014, 7 pages.
(Continued)

*Primary Examiner* — Abu Ghaffari
(74) *Attorney, Agent, or Firm* — Conley Rose, P.C.

(57) ABSTRACT

A storage resource scheduling method and a storage and computing system, where the storage and computing system has a computing system and a storage system, the computing system has at least one computing unit, and the storage system has at least one storage unit. The method executed by the computing system includes: identifying a task type of a computing unit in the at least one computing unit; sending task type information to the storage system, where the task type information carries the task type; acquiring a scheduling policy of the task type according to the task type information; and scheduling, according to the scheduling policy, a storage unit corresponding to the computing unit. In the method, different tasks of a computing unit are perceived, and resource scheduling is performed according to a task type, thereby implementing scheduling and management on different tasks of a same storage unit.

12 Claims, 7 Drawing Sheets

(51) Int. Cl.
*G06F 3/06* (2006.01)
*H04L 29/08* (2006.01)

(52) U.S. Cl.
CPC .......... *G06F 3/0631* (2013.01); *G06F 3/0659* (2013.01); *G06F 9/4881* (2013.01); *H04L 67/1097* (2013.01)

(56) References Cited

U.S. PATENT DOCUMENTS

| | | | | |
|---|---|---|---|---|
| 7,822,731 | B1* | 10/2010 | Yu | G06F 12/0862 707/705 |
| 7,895,520 | B1* | 2/2011 | Doyle | G06F 3/0482 715/733 |
| 7,937,373 | B2* | 5/2011 | Bouse | G05B 23/0264 707/668 |
| 8,225,319 | B2* | 7/2012 | Laithwaite | G06Q 10/06 718/100 |
| 8,407,501 | B2* | 3/2013 | Agarwala | G06F 3/0625 709/226 |
| 8,473,566 | B1* | 6/2013 | Cardente | G06F 3/061 370/252 |
| 8,943,203 | B1* | 1/2015 | Lent | G06F 17/30197 709/203 |
| 9,003,157 | B1* | 4/2015 | Marshak | G06F 3/0685 711/170 |
| 9,152,549 | B1* | 10/2015 | Kesselman | G06F 12/023 |
| 9,442,954 | B2* | 9/2016 | Guha | G06F 9/5066 |
| 9,858,117 | B2* | 1/2018 | Zhang | G06F 9/4881 |
| 10,095,598 | B2* | 10/2018 | Harrison | G06N 5/02 |
| 2004/0243692 | A1* | 12/2004 | Arnold | G06F 9/5016 709/220 |
| 2007/0021998 | A1* | 1/2007 | Laithwaite | G06Q 10/06 705/7.13 |
| 2007/0168394 | A1* | 7/2007 | Vivekanand | H04L 67/322 |
| 2011/0185130 | A1 | 7/2011 | Hara et al. | |
| 2011/0191781 | A1* | 8/2011 | Karanam | G06F 9/50 718/104 |
| 2012/0290789 | A1 | 11/2012 | Susarla et al. | |
| 2013/0179371 | A1 | 7/2013 | Jain et al. | |
| 2014/0181428 | A1* | 6/2014 | Hsu | G06F 12/00 711/154 |
| 2014/0229221 | A1* | 8/2014 | Shih | G06Q 10/06313 705/7.23 |
| 2014/0310455 | A1* | 10/2014 | Baldwin | G06F 3/0641 711/114 |
| 2015/0215426 | A1* | 7/2015 | Torii | H04L 67/32 709/201 |

FOREIGN PATENT DOCUMENTS

| | | |
|---|---|---|
| CN | 102567072 A | 7/2012 |
| CN | 103023963 A | 4/2013 |
| CN | 103414657 A | 11/2013 |
| CN | 103501347 A | 1/2014 |
| CN | 103561098 A | 2/2014 |
| CN | 103581339 A | 2/2014 |
| CN | 103795804 A | 5/2014 |

OTHER PUBLICATIONS

Machine Translation and Abstract of Chinese Publication No. CN103795804, May 14, 2014, 3 pages.
Machine Translation and Abstract of Chinese Publication No. CN101908972, Dec. 8, 2010, 8 pages.
Machine Translation and Abstract of Chinese Publication No. CN103414657, Nov. 27, 2013, 6 pages.
Machine Translation and Abstract of Chinese Publication No. CN103501347, Jan. 8, 2014, 9 pages.
Foreign Communication From a Counterpart Application, Chinese Application No. 201410062471.5, Chinese Office Action dated Aug. 3, 2016, 11 pages.
Foreign Communication From a Counterpart Application, European Application No. 14883281.9, Extended European Search Report dated Oct. 21, 2016, 8 pages.
Foreign Communication From a Counterpart Application, PCT Application No. PCT/CN2014/089540, English Translation of International Search Report dated Feb. 2, 2015, 2 pages.
Foreign Communication From a Counterpart Application, PCT Application No. PCT/CN2014/089540, English Translation of Written Opinion dated Feb. 2, 2015, 9 pages.

* cited by examiner

```
For any computing unit in the at least one computing unit, the computing    ⌒
 system identifies a task type of the computing unit.                        ⌒  201

The computing system acquires a scheduling policy of the task type          ⌒
           according to the task type                                        ⌒  202

The computing system sends the scheduling policy of the task type to the    ⌒
                    storage system                                           ⌒  203

The storage system schedules, according to the scheduling policy, a storage ⌒
       unit that corresponds to the computing unit                           ⌒  204
```

SCHEDULING STORAGE AND COMPUTING RESOURCES BASED ON TASK TYPES AND SERVICE LEVELS

CROSS-REFERENCE TO RELATED APPLICATION

This application is a continuation application of international application number PCT/CN2014/089540 filed on Oct. 27, 2014, which claims priority to Chinese patent application number 201410062471.5 filed on Feb. 24, 2014, both of which are incorporated by reference.

TECHNICAL FIELD

Embodiments of the present disclosure relate to computer technologies, and in particular, to a storage resource scheduling method and a storage and computing system.

BACKGROUND

The service-level agreement (SLA) refers to an agreement that is reached between both parties of a provider and a user in terms of quality and a level of a service, and represents a requirement on quality of service (QoS) from the perspective of the user. In a cloud computing scenario, as two core resources of a cloud, storage and computation are integrated and collaboratively provide various applications to the outside. To ensure QoS of a key application and predictability of various applications, a QoS mechanism needs to be introduced to schedule and manage storage resources.

Generally, in the prior art, storage resources are scheduled and managed in the following manners. A storage system and a computing system are independent of each other, and are managed separately, where the storage system provides a storage unit to the computing system for use, and manages the storage resources at the granularity of the storage unit. Furthermore, computing units, for example, virtual machines (VMs), in the computing system correspond to different storage units, where an SLA level is configured in advance for each VM according to QoS, and the storage system performs optimization and performance management on each storage unit according to the SLA level. However, in the prior art, resources can be processed and scheduled only between different storage units.

SUMMARY

Embodiments of the present disclosure provide a storage resource scheduling method and a storage and computing system.

According to a first aspect, an embodiment of the present disclosure provides a storage resource scheduling method, applied to a storage and computing system that has a computing system and a storage system, where the computing system has at least one computing unit, and the storage system has at least one storage unit, where the method includes for any computing unit in the at least one computing unit, identifying, by the computing system, a task type of the computing unit, sending, by the computing system, task type information to the storage system, where the task type information carries the task type, acquiring, by the storage system, a scheduling policy of the task type according to the task type information, and scheduling, by the storage system according to the scheduling policy, a storage unit corresponding to the computing unit.

In a first possible implementation manner of the first aspect, the scheduling policy is a storage service level of the task type, and the storage system stores a correspondence between the task type and the storage service level, where acquiring, by the storage system, a scheduling policy of the task type according to the task type information includes searching, by the storage system according to the task type information, the correspondence to determine the storage service level of the task type.

In a second possible implementation manner of the first aspect, the task type information further carries a service level of the computing unit, and acquiring, by the storage system, a scheduling policy of the task type according to the task type information includes determining, by the storage system according to the task type information, operation information corresponding to the task type, and processing the service level of the computing unit according to the operation information to obtain the scheduling policy of the task type.

In a third possible implementation manner of the first aspect, the scheduling policy is a performance indicator, where acquiring, by the storage system, a scheduling policy of the task type according to the task type information includes generating, by the storage system, the performance indicator for the task type according to the task type information.

With reference to the first aspect or the first, second, or third possible implementation manner of the first aspect, in a fourth possible implementation manner of the first aspect, before sending, by the computing system, the task type information to the storage system, the method further includes establishing, by the computing system, a communications interface between the computing system and the storage system, where sending, by the computing system, the task type information to the storage system includes sending, by the computing system, the task type information to the storage system using the communications interface.

With reference to the first aspect or the first, second, or third possible implementation manner of the first aspect, in a fifth possible implementation manner of the first aspect, before sending, by the computing system, the task type information to the storage system, the method further includes configuring, by the computing system, a configuration file for communication between the computing system and the storage system, where sending, by the computing system, the task type information to the storage system includes adding, by the computing system, the task type information in the configuration file, and sending the configuration file to the storage system.

According to a second aspect, an embodiment of the present disclosure provides a storage resource scheduling method, applied to a storage and computing system that has a computing system and a storage system, where the computing system has at least one computing unit, and the storage system has at least one storage unit, where the method includes for any computing unit in the at least one computing unit, identifying, by the computing system, a task type of the computing unit, acquiring, by the computing system, a scheduling policy of the task type according to the task type, sending, by the computing system, the scheduling policy of the task type to the storage system, and scheduling, by the storage system according to the scheduling policy, a storage unit corresponding to the computing unit.

In a first possible implementation manner of the second aspect, the scheduling policy is a storage service level of the task type, and the computing system stores a correspondence between the task type and the storage service level, where acquiring, by the computing system, a scheduling policy of the task type according to the task type includes searching, by the computing system according to the task type, the correspondence to determine the storage service level of the task type.

In a second possible implementation manner of the second aspect, acquiring, by the computing system, a scheduling policy of the task type according to the task type includes determining, by the computing system, operation information corresponding to the task type, and processing, according to the operation information, a service level of the computing unit to obtain the scheduling policy of the task type.

In a third possible implementation manner of the second aspect, the scheduling policy is a performance indicator, where acquiring, by the computing system, a scheduling policy of the task type according to the task type includes generating, by the computing system, the performance indicator for the task type according to the task type.

According to a third aspect, an embodiment of the present disclosure provides a storage and computing system, including a computing system and a storage system, where the computing system has at least one computing unit, and the storage system has at least one storage unit, where the computing system further includes an identifying module and a sending module, and the storage system further includes a task parsing module and a QoS module, where the identifying module is configured to identify, for any computing unit in the at least one computing unit, a task type of the computing unit. The sending module is configured to send task type information to the task parsing module of the storage system, where the task type information carries the task type. The task parsing module is configured to acquire a scheduling policy of the task type according to the task type information, and the QoS module is configured to schedule, according to the scheduling policy parsed out by the task parsing module, a storage unit corresponding to the computing unit.

In a first possible implementation manner of the third aspect, when the scheduling policy is a storage service level of the task type, the storage system further includes a storage module configured to store a correspondence between the task type and the storage service level, where the task parsing module is configured to search, according to the task type information, the correspondence stored by the storage module, to determine the storage service level of the task type.

In a second possible implementation manner of the third aspect, when the task type information further carries a service level of the computing unit, the task parsing module is further configured to determine, according to the task type information, operation information corresponding to the task type, and process the service level of the computing unit according to the operation information to obtain the scheduling policy of the task type.

In a third possible implementation manner of the third aspect, when the scheduling policy is a performance indicator, the task parsing module is configured to generate the performance indicator for the task type according to the task type information.

With reference to the third aspect or the first, second, or third possible implementation manner of the third aspect, in a fourth possible implementation manner of the third aspect, the computing system further includes a communications interface establishment module, where the communications interface establishment module is configured to establish a communications interface between the computing system and the storage system, and the sending module is configured to send the task type information to the storage system using the communications interface established by the communications interface establishment module.

With reference to the third aspect or the first, second, or third possible implementation manner of the third aspect, in a fifth possible implementation manner of the third aspect, the computing system further includes a configuration module, where the configuration module is configured to configure a configuration file for communication between the computing system and the storage system, and the sending module is configured to add the task type information to the configuration file configured by the configuration module, and send the configuration file to the storage system.

According to a fourth aspect, an embodiment of the present disclosure provides a storage and computing system, including a computing system and a storage system, where the computing system has at least one computing unit, and the storage system has at least one storage unit, where the computing system further includes an identifying and mapping module and a sending module, and the storage system further includes a QoS module, where the identifying and mapping module is configured to identify, for any computing unit in the at least one computing unit, a task type of the computing unit, and acquire a scheduling policy of the task type according to the task type. The sending module is configured to send the scheduling policy of the task type to the QoS module of the storage system, and the QoS module is configured to schedule, according to the scheduling policy sent by the sending module, a storage unit corresponding to the computing unit.

In a first possible implementation manner of the fourth aspect, when the scheduling policy is a storage service level of the task type, the computing system further includes a storage module configured to store a correspondence between the task type and the storage service level, where the identifying and mapping module searches, according to the task type, the correspondence stored by the storage module, to determine the storage service level of the task type.

In a second possible implementation manner of the fourth aspect, the identifying and mapping module is configured to determine operation information corresponding to the task type, and process a service level of the computing unit according to the operation information to obtain the scheduling policy of the task type.

In a third possible implementation manner of the fourth aspect, when the scheduling policy is further a performance indicator, the identifying and mapping module is configured to generate the performance indicator for the task type according to the task type.

According to the storage resource scheduling method and the storage and computing system provided in the embodiments of the present disclosure, for any computing unit, the computing system identifies a task type of the computing unit. The computing system sends task type information to a storage system, where the task type information carries the task type. The storage system configures a scheduling policy for the task type according to the task type information, and the storage system schedules, according to the scheduling policy, a storage unit corresponding to the computing unit. Alternatively, for any computing unit, the computing system identifies a task type of the computing unit, acquires a scheduling policy according to the task type, and then, sends the scheduling policy to a storage system such that the storage system schedules a storage unit corresponding to the computing unit. In the foregoing method, different tasks of a computing unit are perceived, and resource scheduling is performed according to a task type, thereby implementing scheduling and management on different tasks of a same storage unit.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure shall fall within the protection scope of the present disclosure.

Figure 1:
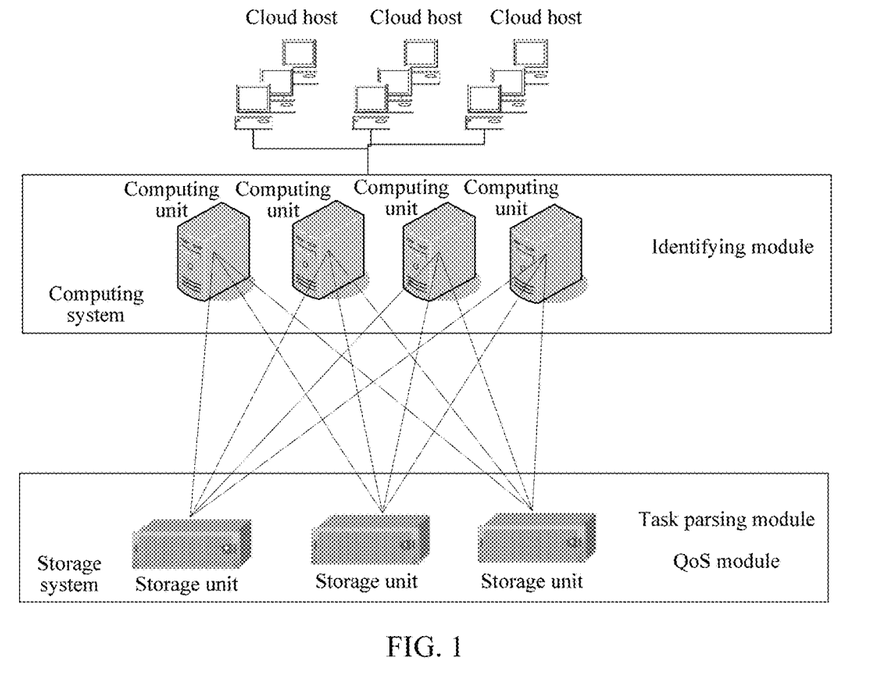
FIG. 1 is a schematic architectural diagram of a storage and computing system to which a storage resource scheduling method is applied according to the present disclosure.

FIG. 1 is a schematic architectural diagram of a storage and computing system to which a storage resource scheduling method is applied according to the present disclosure. As shown in FIG. 1, the storage and computing system, for example, a cloud system, generally includes three resources a computing system, a storage system, and a network (not shown in the figure), where the computing system has at least one computing unit, for example, a VM, where different applications may run on a computing unit, for example, a database, a virtual device interface (VDI), an electronic-mail (e-mail) service, and the like, and a physical device of the storage system may be a server, a network attached storage (NAS), a storage area network (SAN), or the like, and the storage system manages a storage resource at the granularity of a storage unit, where the storage unit is, for example, a volume (logical unit number (Lun)), a file, or a host. It should be noted that, in this embodiment, the computing and storage system is divided into the computing system and the storage system from a logical perspective. However, in actual deployment, the computing system and the storage system may be deployed independently or integrally, to provide a virtual service outwards using a virtualization technology, for example, a cloud host.

Figure 2:
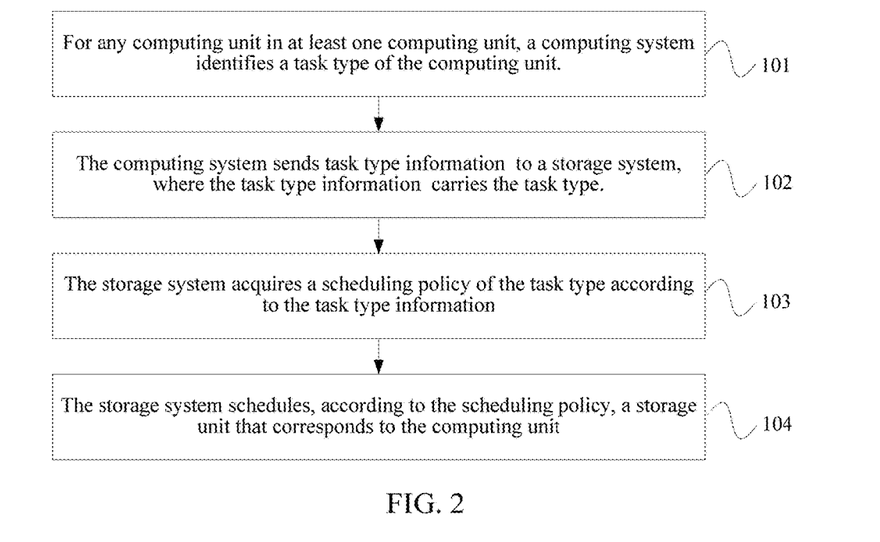
FIG. 2 is a flowchart of Embodiment 1 of a storage resource scheduling method according to the present disclosure.

FIG. 2 is a flowchart of Embodiment 1 of a storage resource scheduling method according to the present disclosure. With reference to detailed descriptions of both FIG. 1 and FIG. 2, this embodiment includes the following steps.

Step 101: For any computing unit in at least one computing unit, a computing system identifies a task type of the computing unit.

As shown in FIG. 1, an identifying module is deployed on the computing system, and is configured to identify the task type of any computing unit of the computing system. Using that the computing unit is a VM as an example, the identifying module of the computing system identifies a task type of the VM, where the task includes an operation task or an application service of the VM, where the operation task includes, but is not limited to startup, restart, creation, deletion, migration, or wakeup of the VM, and the application service includes, but is not limited to antivirus, backup, or remote replication redundancy of the VM. Furthermore, the identifying module identifies a current task type of the VM when the computing system manages the VM.

Step 102: The computing system sends task type information to a storage system, where the task type information carries the task type.

After identifying the current task type of the VM, the computing system sends the task type information to the storage system, where the task type information carries the task type, and the task type information includes, but is not limited to an identity (ID) of the VM, and a type of an operation task or application service of the VM. Optionally, the task type information may further include an SLA level of the VM, or the like.

Step 103: The storage system acquires a scheduling policy of the task type according to the task type information.

As shown in FIG. 1, a task parsing module is deployed on the storage system, and is used to parse the task type information sent by the computing system, and acquire the scheduling policy for the task type carried in the task type information. The scheduling policy is, for example, an SLA level of a storage unit corresponding to the computing unit, a performance requirement of the storage unit, or the like. Further, a user may set or modify scheduling policies of task types of different computing units using a configuration interface, a configuration command, or a configuration file parameter, or in a system default manner.

Step 104: The storage system schedules, according to the scheduling policy, a storage unit corresponding to the computing unit.

As shown in FIG. 1, a QoS module is deployed on the storage system, and is used to schedule, according to the scheduling policy, the storage unit corresponding to the computing unit. Further, the QoS module performs, according to the scheduling policy, performance management and resource scheduling on a managed computing unit, for example, an object such as a Lun, a file, or a host, to satisfy QoS and a service level of the user. The scheduling may include, but is not limited to service migration, service limitation, traffic control, and resource scheduling.

According to the storage resource scheduling method provided in this embodiment of the present disclosure, for any computing unit, a computing system identifies a task type of the computing unit, and the computing system sends task type information to a storage system, where the task type information carries the task type, and the storage system acquires a scheduling policy of the task type according to the task type information, and schedules, according to the scheduling policy, a storage unit corresponding to the computing unit. In the method, different tasks of a computing unit are perceived, and resource scheduling is performed according to a task type, thereby implementing scheduling and management on different tasks of a same storage unit.

Optionally, in the foregoing embodiment, the computing system establishes a communications interface between the computing system and the storage system, and the computing system sends the task type information to the storage system using the communications interface.

Further, the communications interface may be configured between the computing system and the storage system according to a specific protocol, and the task type information is transferred using the communications interface.

Optionally, in the foregoing embodiment, the computing system configures a configuration file for communication between the computing system and the storage system, and the computing system adds the task type information to the configuration file, and sends the configuration file to the storage system, for example, the task type information is transferred using an extensible markup language (XML) configuration file or the like.

It should be noted that, in the schematic architectural diagram of the storage and computing system shown in FIG. 1, the identifying module, the task parsing module, the QoS module, and the like that are newly added to implement the present disclosure may be flexibly deployed, and the present disclosure is not limited thereto. For example, the identifying module and the task parsing module may be both deployed on a computing system side. For details, refer to FIG. 3.

Figure 3:
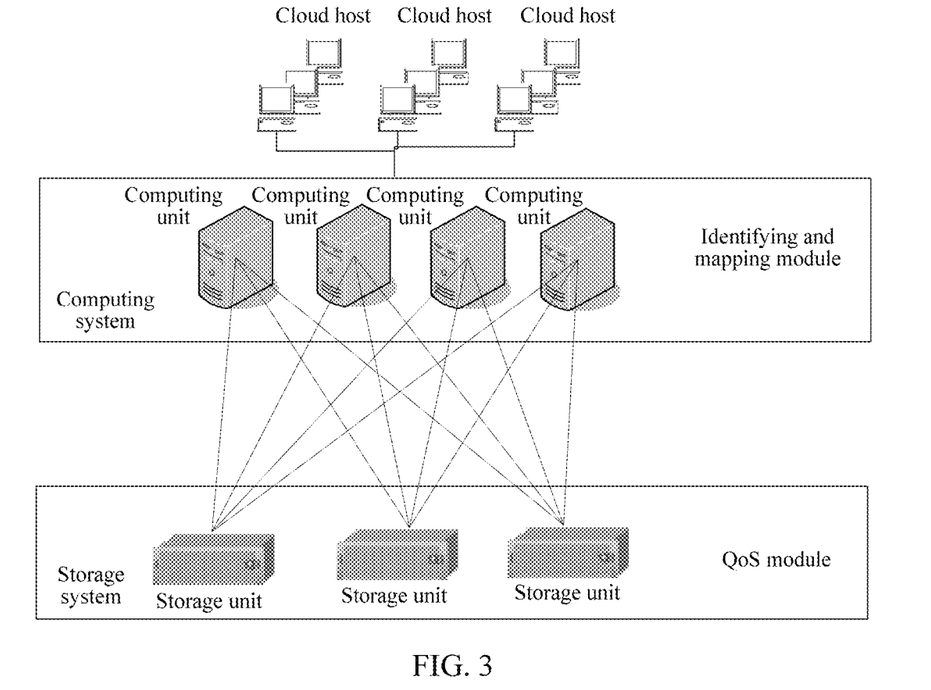
FIG. 3 is another schematic architectural diagram of a storage and computing system to which a storage resource scheduling method is applied according to the present disclosure.

FIG. 3 is another schematic architectural diagram of a storage and computing system to which a storage resource scheduling method is applied according to the present disclosure. Compared with the embodiment of FIG. 1, in this embodiment, an identifying module and a task parsing module are functionally integrated, where the two modules are combined into one "identifying and mapping module", and the identifying and mapping module is deployed on a computing system side.

Referring to FIG. 3, the identifying and mapping module is configured to identify a service type such as an operation task and a service application of a VM, directly acquire, on the computing system side, a scheduling policy of a storage unit corresponding to a computing unit, and then send the scheduling policy to a storage system using a message interface, a configuration file, or the like such that a QoS module of the storage system performs corresponding performance management and scheduling. As can be known from this, in this embodiment, the scheduling policy is directly acquired, on the computing system side according to a task type, for the storage unit corresponding to the computing unit, and task type information does not need to be sent to the storage system.

Based on the storage and computing system shown in FIG. 3, an embodiment of the present disclosure further provides a storage resource scheduling method. For details, reference may be made to FIG. 4.

Figure 4:
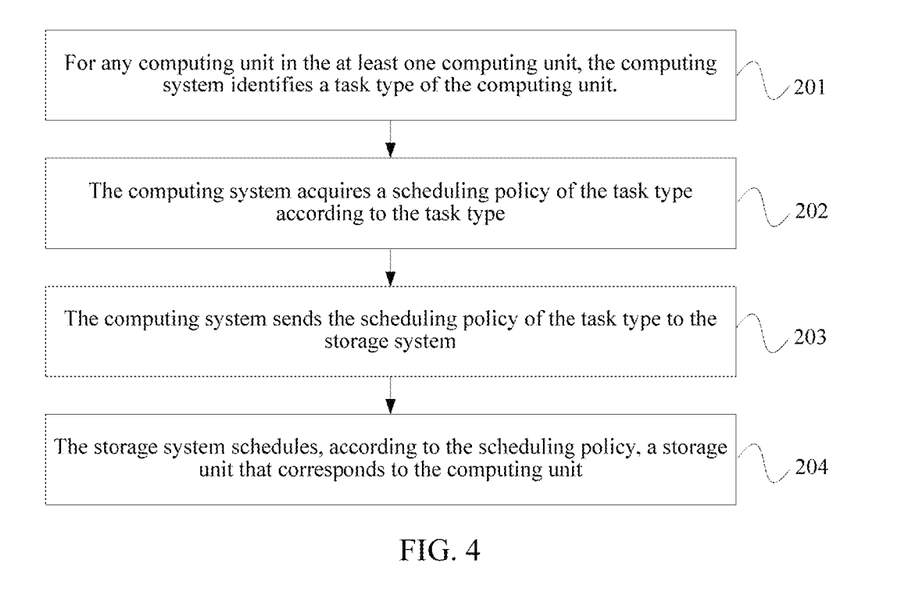
FIG. 4 is a flowchart of Embodiment 2 of a storage resource scheduling method according to the present disclosure.

FIG. 4 is a flowchart of Embodiment 2 of the storage resource scheduling method according to the present disclosure. This embodiment is also applied to a storage and computing system that has a computing system and a storage system, where the computing system has at least one computing unit, and the storage system has at least one storage unit. With reference to detailed descriptions of both FIG. 3 and FIG. 4, this embodiment includes the following steps.

Step 201: For any computing unit in the at least one computing unit, the computing system identifies a task type of the computing unit.

As shown in FIG. 3, an identifying and mapping module is deployed on the computing system, and is configured to identify the task type of any computing unit of the computing system. In this step, for related descriptions about the task type, reference may be made to step 101 of FIG. 2 above, and details are not described herein again.

Step 202: The computing system acquires a scheduling policy of the task type according to the task type.

Compared with FIG. 2 in which the computing system sends task type information to the storage system such that the storage system acquires scheduling information of the task type, in this embodiment, the scheduling policy of the task type is acquired by the identifying and mapping module deployed on the computing system.

Step 203: The computing system sends the scheduling policy of the task type to the storage system.

Step 204: The storage system schedules, according to the scheduling policy, a storage unit corresponding to the computing unit.

In the foregoing step 203 and step 204, the computing system directly sends the scheduling policy to the storage system after acquiring the scheduling policy of the task type, and correspondingly, the storage system receives the scheduling policy, and schedules, according to the scheduling policy, the storage unit corresponding to the computing unit.

According to the storage resource scheduling method provided in this embodiment of the present disclosure, for any computing unit, a computing system identifies a task type of the computing unit, acquires a scheduling policy according to the task type, and then, sends the scheduling policy to a storage system such that the storage system schedules a storage unit corresponding to the computing unit. In the method, different tasks of a computing unit are perceived, and resource scheduling is performed according to a task type, thereby implementing scheduling and management on different tasks of a same storage unit.

Figure 5:
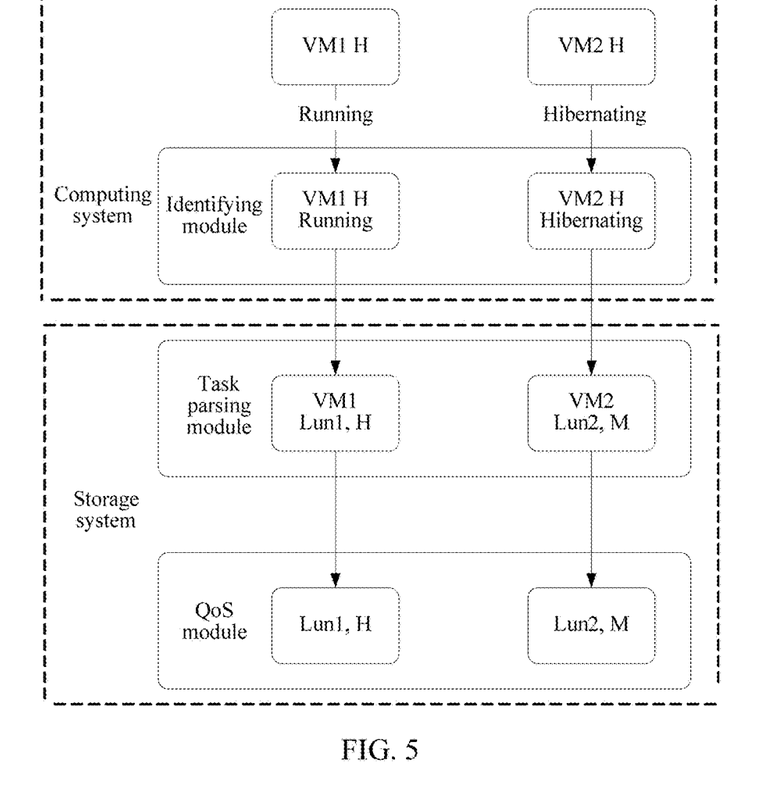
FIG. 5 is a schematic diagram of a process of Embodiment 3 of a storage resource scheduling method according to the present disclosure.

FIG. 5 is a schematic diagram of a process of Embodiment 3 of a storage resource scheduling method according to the present disclosure. In this embodiment, a computing unit is a VM. Using VM1 and VM2 whose SLA levels are both "high" as an example, this embodiment further includes the following steps.

Step S1: A user or a manager allocates a VM on a management interface or a self-service platform, where a resource such as a central processing unit (CPU), a memory, or a volume device is separately applied for from a computing system and a storage system in order to create the VM.

In this step, it is assumed that two VMs are created, that is, VM1 and VM2, where SLA levels of VM1 and VM2 are both "high", that is "H". The SLA level may be specified when the VM create is created, or may be generated according to a default configuration, and the present disclosure is not limited thereto. A storage unit corresponding to VM1 is Lun1, and a storage unit corresponding to VM2 is Lun2.

Step S2: VM1 is in a normal running (Running) state after startup, and the computing system delivers a hibernation instruction to VM2 such that VM2 enters a hibernation (Hibernating) state.

Step S3: An identifying module on the computing system identifies and records task types of VM1 and VM2, adds the task types to task type information, and transfers the task type information to the storage system using a message protocol interface or a configuration file.

In this step, the task type information may be represented using, for example, Table 1, where Table 1 is an attribute table of the task type information of the present disclosure.

TABLE 1

| VM ID | SLA | State | State ID | Other |
|---|---|---|---|---|
| VM1 | H | Running | 6 | ... |
| VM2 | H | Hibernating | 5 | ... |

Step S4: After receiving the task type information, and parsing and identifying the task type information, a task parsing module on the storage system acquires a scheduling policy according to a task type such as an operation service or an application service of the VM, and delivers the scheduling policy to a QoS module on the storage system. In Table 1, that operation tasks are Running and Hibernating is used as an example.

Further, the storage system prestores a mapping table of a correspondence between a task type and a storage service level SLA, as shown in Table 2. Table 2 may be set by the user autonomously, or may be configured by the system by default.

With reference to Table 2, for VM1, a scheduling policy acquired by a task parsing module for the storage unit corresponding to VM1, that is, Lun1, is "H", and for VM2, a scheduling policy acquired by a task parsing module for the storage unit corresponding to VM2, that is, Lun2, is "M" represents that the scheduling policy is medium. In Table 2, a scheduling policy L represents that the scheduling policy is low.

TABLE 2

| Task number | Task type | Scheduling policy | Other |
|---|---|---|---|
| 1 | VM creation | M | ... |
| 2 | VM deletion | L | ... |
| 3 | VM startup | H | ... |
| 4 | VM migration | H | ... |
| 5 | VM hibernation | M | ... |
| 6 | Running | H | ... |
| 7 | VM backup | L | ... |
| 8 | VM antivirus | L | ... |
| ... | ... | ... | ... |

Step S5: A QoS module on the storage system manages and schedules, at the granularity of a Lun according to the scheduling policy, a storage unit corresponding to each VM in order to uniformly manage resources of the storage system, and properly allocate the sources, thereby satisfying QoS and SLA requirements, and satisfying user experience. For example, for the storage unit Lun1 corresponding to VM1, the QoS module performs assurance according to the policy "H", and for the storage unit Lun2 corresponding to VM2, the QoS module performs scheduling assurance according to the policy "M". Compared with a method in the prior art that a storage unit corresponding to a VM is scheduled only according to an SLA level of the VM, in this embodiment of the present disclosure, VMs in different task types can be subdivided, and an objective of scheduling the VMs according to the different task types of the VMs can be implemented.

In this embodiment, the storage system may perform, according to task types of different VMs, intelligent scheduling on the storage unit corresponding to each VM, to implement intelligent scheduling and management on the storage unit for different tasks, guarantee critical services, and preferably protect performance of key operation tasks, thereby properly allocating resources. For example, a large quantity of input/output (TO) is generated when VMs are created in batches. In this case, online experience of a user of a running VM is affected, but service real-time performance of a task type of VM creation may not be high. Therefore, using the present disclosure, priorities of task types can be distinguished, thereby effectively resolving this problem, and avoiding impact exerted on an online user by batch operations.

In the embodiment of FIG. 5, a mapping relationship between the task type and the scheduling policy is static, for example, as shown in Table 2. However, the present disclosure is not limited thereto, and in another possible implementation manner, the scheduling policy corresponding to the task type may be dynamically configured. For example, when the task type information carries a service level SLA of the computing unit itself, and the scheduling policy is operation information for the storage service level SLA corresponding to the task type, the storage system may determine, according to the task type information, the operation information corresponding to the task type, and process the service level SLA of the computing unit itself according to the operation information to obtain the scheduling policy of the task type. Further, as can be seen in Table 3, Table 3 is a mapping table of the correspondence between the task type and the storage service level SLA in Embodiment 3 of the storage resource scheduling method of the present disclosure.

TABLE 3

| Task number | Task type | Operation information | Scheduling policy (where an SLA of VM1 is H) | Scheduling policy (where an SLA of VM2 is M) |
|---|---|---|---|---|
| 1 | VM creation | Downgrading by one level | M | L |
| 2 | VM deletion | Downgrading by two levels | L | L |
| 3 | VM startup | Unchanged | H | M |
| 4 | VM migration | Unchanged | H | M |
| 5 | VM hibernation | Downgrading by one level | M | L |
| 6 | Running | Unchanged | H | M |
| 7 | VM backup | Downgrading by one level | M | L |
| 8 | VM antivirus | Downgrading by two levels | L | L |
| ... | ... | ... | ... | ... |

With reference to Table 3, in this embodiment, the storage system acquires the scheduling policy of the task type according to the SLA level and the task type of the VM itself such that the QoS module schedules and manages, according to the scheduling policy, the storage unit corresponding to the computing unit. In the storage resource scheduling process, compared with the foregoing embodiments, for a VM in any level, a storage unit corresponding to the VM is not scheduled and managed in a fixed mode, but the storage unit corresponding to the VM is scheduled with reference to an SLA level and a task type of the VM itself. For example, the SLA level of VM1 is "H", and the SLA level of VM2 is "M". Then, according to Table 3, for a same task type of VM creation, the SLA level of VM1 "downgrading by one level" such that a scheduling policy of the storage unit corresponding to VM1 is "M", and a scheduling policy of the storage unit corresponding to VM2 is low, that is "L".

It should be noted that, the SLA level of the VM is operated according to the operation information in Table 3, and processing is performed according to the lowest SLA level if the SLA level of the VM is lower than the lowest SLA level. Using VM2 as an example, if a task type is VM deletion, because the SLA level of VM2 itself is "M", and is lower than the lowest SLA level "L" after downgrading by two levels", in this case, for a task type of VM2 deletion, the scheduling policy of the storage unit corresponding to VM2 is "L".

In addition, the scheduling policy may also be a specific performance indicator as well as the foregoing SLA level, and the storage system generates the performance indicator for the task type according to the task type information. The performance indicator includes, but is not limited to a transmission rate (million bits per second (MBPS)), input/output operations per second (IOPS), a service delay, and an IO delay. The QoS module of the storage system acquires, for the task type according to the performance indicator a scheduling policy satisfying the performance indicator. Furthermore, reference may be made to Table 4. Table 4 is a mapping table of a correspondence between a task type and a scheduling policy in Embodiment 4 of the storage resource scheduling method of the present disclosure.

TABLE 4

| Task number | Task type | Scheduling policy | Other |
|---|---|---|---|
| 1 | VM creation | MBPS ≤ 30 megabits (MB) | . . . |
| 2 | VM deletion | IOPS ≤ 50% | . . . |
| 3 | VM startup | Unchanged | . . . |
| 4 | VM migration | Unchanged | . . . |
| 5 | VM hibernation | MBPS ≤ 20 MB | . . . |
| 6 | Running | Unchanged | . . . |
| 7 | VM backup | Twice a delay | . . . |
| 8 | VM antivirus | IOPS ≤ 50% | . . . |
| . . . | . . . | . . . | . . . |

With reference to Table 4, in this embodiment, the storage system schedules, according to the task type and the performance indicator, the storage unit corresponding to the computing unit. The performance indicator may be fixed or may be relative, for example, the SLA level of VM1 is "H", and the SLA level of VM2 is "L" if VM1 and VM2 are deleted at the same time. In this case, performance indicators may be separately set for the VM whose level is "H" and the VM whose level is "L".

In addition, it should be noted that, a manner in Table 2 of statically mapping the task type to the scheduling policy, a manner in Table 3 of dynamically mapping the task type to the scheduling policy, and a manner in Table 4 of mapping the task type to the scheduling policy using the performance indicator are not independent, and may also be used in combination in an actual feasible implementation manner, for example, the manner in Table 2, the manner in Table 3, and the manner in Table 4 may be validated according to time, where in a time period, an SLA level, a MBPS performance indicator, or the like in the time period is configured for a storage unit corresponding to a VM.

It should be noted that, in FIG. 5 and Table 1, Table 2, Table 3, and Table 4, the present disclosure is described in detail using an example in which a storage and computing system uses the architecture shown in FIG. 1, where in step S3 and step S4, a computing system identifies a task type and sends task type information to a storage system, and the storage system acquires a scheduling policy according to the task type. However, the present disclosure is not limited thereto, and in another feasible implementation manner, for example, when the storage and computing system uses the architecture shown in FIG. 3, the computing system may also identify the task type, acquire the scheduling policy, and then directly send the scheduling policy to the storage system. For details, refer to specific descriptions in the foregoing embodiment.

Figure 6:
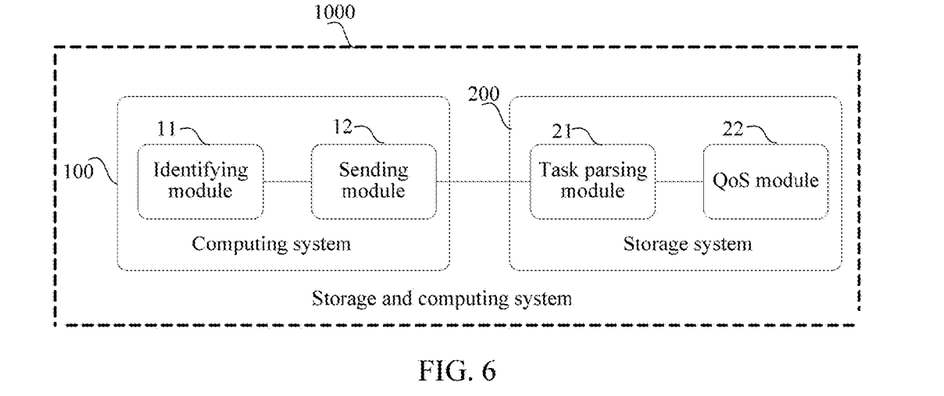
FIG. 6 is a schematic structural diagram of Embodiment 1 of a storage and computing system according to the present disclosure.

FIG. 6 is a schematic structural diagram of Embodiment 1 of a storage and computing system according to the present disclosure. The storage and computing system provided in this embodiment is an apparatus embodiment corresponding to the embodiment of FIG. 2 of the present disclosure, and a specific implementation process is not described herein again. Further, the storage and computing system 1000 provided in this embodiment includes a computing system 100 and a storage system 200, where the computing system 100 has at least one computing unit (not shown), and the storage system 200 has at least one storage unit (not shown), and the computing system 100 further includes an identifying module 11 and a sending module 12, and the storage system 200 includes a task parsing module 21 and a QoS module 22.

The identifying module 11 is configured to identify, for any computing unit in the at least one computing unit, a task type of the computing unit.

The sending module 12 is configured to send task type information to the task parsing module 21 of the storage system 200, where the task type information carries the task type.

The task parsing module 21 is configured to acquire a scheduling policy of the task type according to the task type information.

The QoS module 22 is configured to schedule, according to the scheduling policy parsed out by the task parsing module 21, a storage unit corresponding to the computing unit.

According to the storage and computing system provided in this embodiment of the present disclosure, for any computing unit, the computing system identifies a task type of the computing unit, and the computing system sends task type information to the storage system, where the task type information carries the task type, and the storage system acquires a scheduling policy of the task type according to the task type information, and schedules, according to the scheduling policy, a storage unit corresponding to the computing unit. In the method, different tasks of a computing unit are perceived, and resource scheduling is performed according to a task type, thereby implementing scheduling and management on different tasks of a same storage unit.

Figure 7:
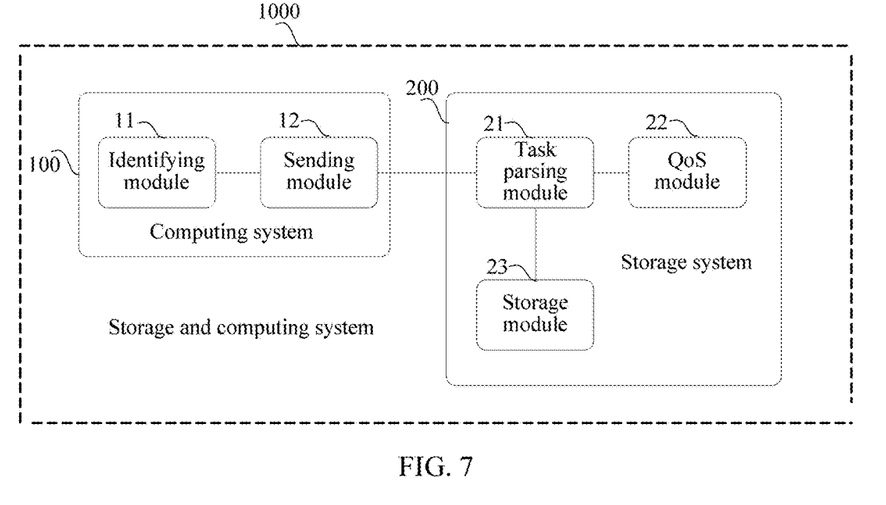
FIG. 7 is a schematic structural diagram of Embodiment 2 of a storage and computing system according to the present disclosure.

FIG. 7 is a schematic structural diagram of Embodiment 2 of a storage and computing system according to the present disclosure. As shown in FIG. 7, the storage and computing system 1000 is based on a structure of the apparatus of FIG. 6, further, when the scheduling policy is a storage service level of the task type, the storage system 200 further includes a storage module 23 configured to store a correspondence between the task type and the storage service level.

The task parsing module 21 is further configured to search, according to the task type information, the correspondence stored by the storage module 23, to determine the storage service level of the task type.

Optionally, the task parsing module 21 is further configured to determine, according to the task type information, operation information corresponding to the task type, and process a service level of the computing unit according to the operation information to obtain the scheduling policy of the task type when the task type information further carries the service level of the computing unit.

Optionally, when the scheduling policy is a performance indicator, the task parsing module 21 is further configured to generate the performance indicator for the task type according to the task type information.

Figure 8A:
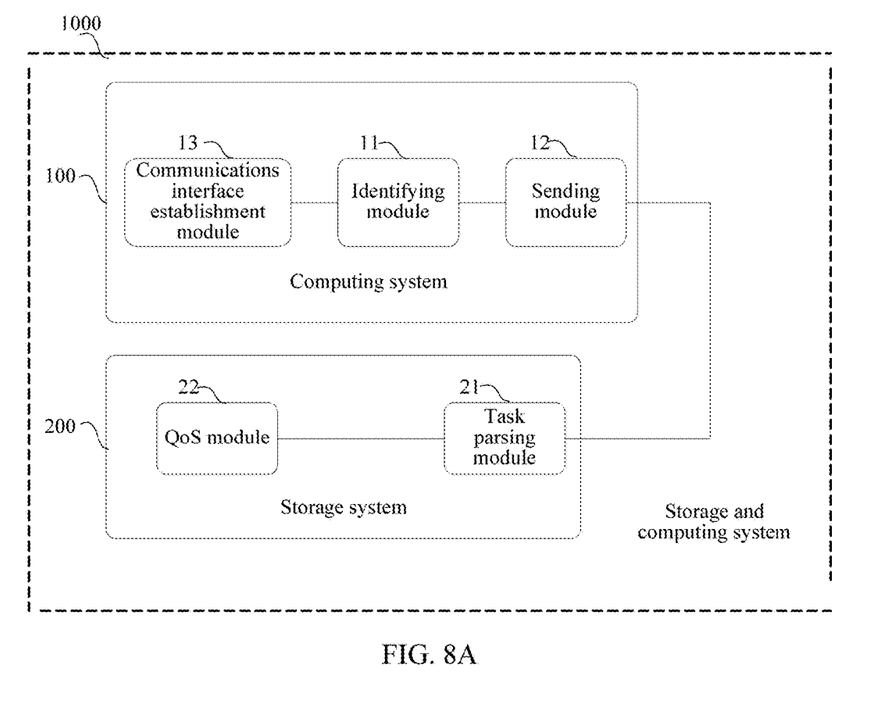
FIG. 8A is a schematic structural diagram of Embodiment 3 of a storage and computing system according to the present disclosure.

FIG. 8A is a schematic structural diagram of Embodiment 3 of a storage and computing system according to the present disclosure. As shown in FIG. 8A, the storage and computing system 1000 is based on a structure of the apparatus of FIG. 6, further, the computing system 100 includes a communications interface establishment module 13.

The communications interface establishment module 13 is configured to establish a communications interface between the computing system 100 and the storage system 200.

The sending module 12 is further configured to send the task type information to the storage system 200 using the communications interface established by the communications interface establishment module 13.

Figure 8B:
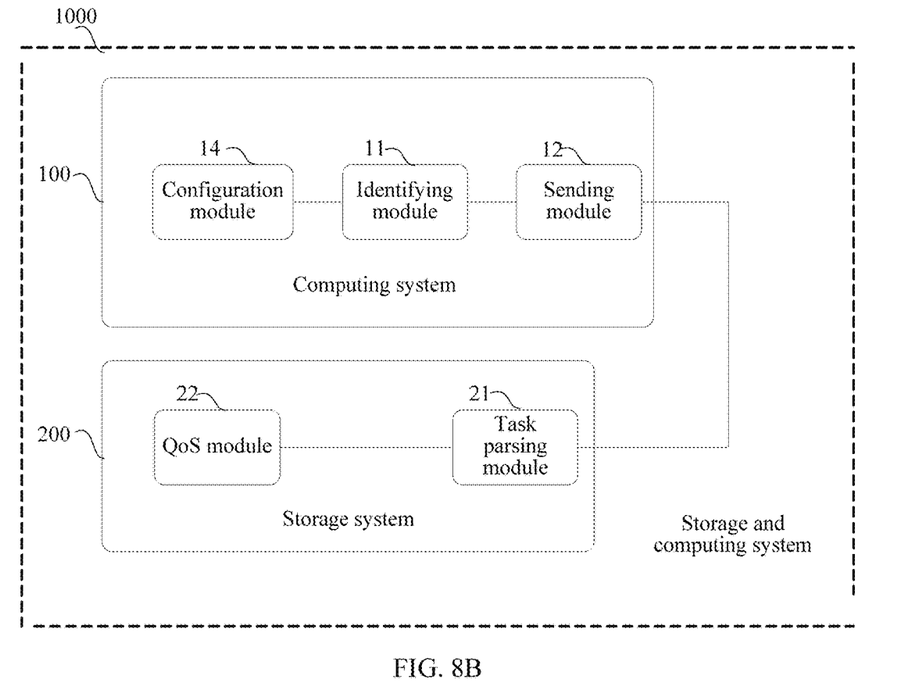
FIG. 8B is a schematic structural diagram of Embodiment 4 of a storage and computing system according to the present disclosure.

FIG. 8B is a schematic structural diagram of Embodiment 4 of a storage and computing system according to the present disclosure. As shown in FIG. 8B, the storage and computing system 1000 is based on a structure of the apparatus of FIG. 6, further, the computing system 100 includes a configuration module 14.

The configuration module 14 is configured to configure a configuration file for communication between the computing system 100 and the storage system 200.

The sending module 12 is further configured to add the task type information to the configuration file configured by the configuration module 14, and send the configuration file to the storage system.

It should be noted that, in FIG. 8A and FIG. 8B, optionally, the storage and computing system 1000 further includes a storage module (not shown) configured to store a correspondence between the task type and a storage service level when the scheduling policy is the storage service level of the task type.

Figure 9:
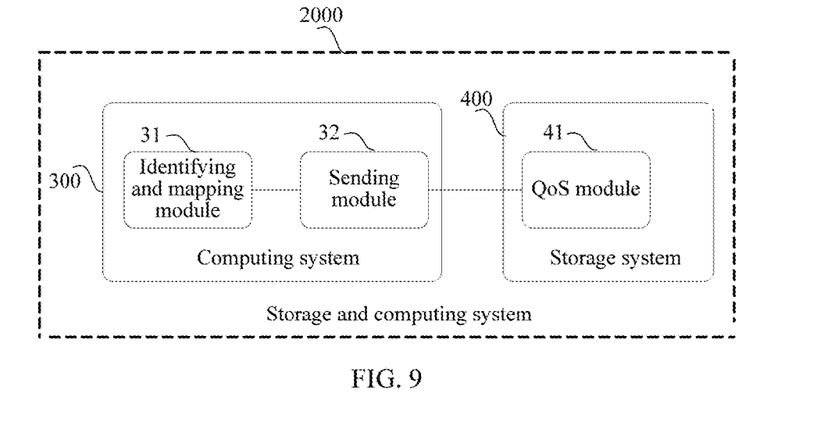
FIG. 9 is a schematic structural diagram of Embodiment 5 of a storage and computing system according to the present disclosure.

FIG. 9 is a schematic structural diagram of Embodiment 5 of a storage and computing system according to the present disclosure. The storage and computing system provided in this embodiment is an apparatus embodiment corresponding to the embodiment of FIG. 4 of the present disclosure, and a specific implementation process is not described herein again. Further, the storage and computing system 2000 provided in this embodiment includes a computing system 300 and a storage system 400, where the computing system 300 has at least one computing unit (not shown), and the storage system 400 has at least one storage unit (not shown), and the computing system 300 further includes an identifying and mapping module 31 and a sending module 32, and the storage system 400 includes a QoS module 41.

The identifying and mapping module 31 is configured to identify, for any computing unit in the at least one computing unit, a task type of the computing unit, and acquire a scheduling policy of the task type according to the task type.

The sending module 32 is configured to send the scheduling policy of the task type to the QoS module 41 of the storage system 400.

The QoS module 41 is configured to schedule, according to the scheduling policy sent by the sending module 32, a storage unit corresponding to the computing unit.

According to the storage and computing system provided in this embodiment of the present disclosure, for any computing unit, the computing system identifies a task type of the computing unit, acquires a scheduling policy according to the task type, and then, sends the scheduling policy to the storage system such that the storage system schedules a storage unit corresponding to the computing unit. In the method, different tasks of a computing unit are perceived, and resource scheduling is performed according to a task type, thereby implementing scheduling and management on different tasks of a same storage unit.

Figure 10:
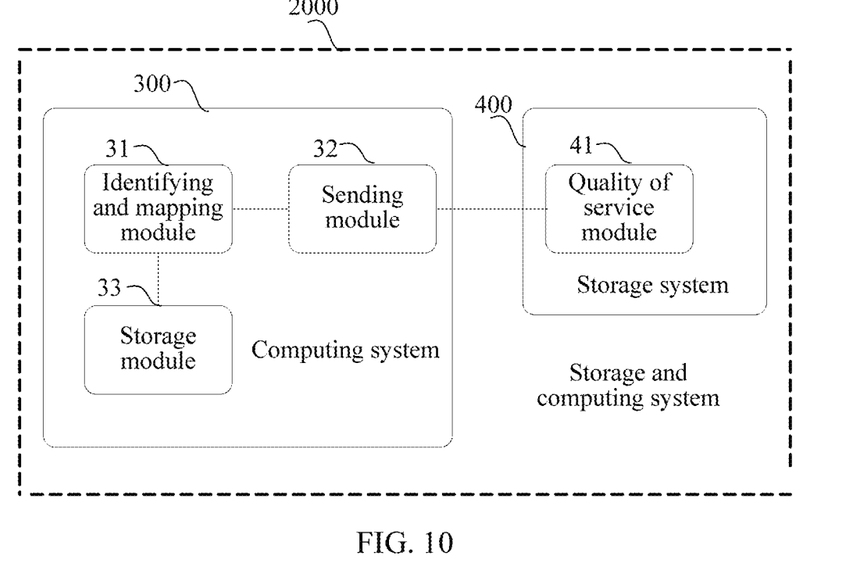
FIG. 10 is a schematic structural diagram of Embodiment 6 of a storage and computing system according to the present disclosure.

FIG. 10 is a schematic structural diagram of Embodiment 6 of a storage and computing system according to the present disclosure. As shown in FIG. 10, the storage and computing system 2000 is based on a structure of the apparatus of FIG. 9, the computing system 300 further includes a storage module 33 configured to store a correspondence between the task type and a storage service level when the scheduling policy is the storage service level of the task type.

The identifying and mapping module 31 is further configured to search, according to the task type, the correspondence stored by the storage module 33, to determine the storage service level of the task type.

Optionally, the identifying and mapping module 31 is further configured to determine operation information corresponding to the task type, and process, according to the operation information, a service level of the computing unit to obtain the scheduling policy of the task type.

Optionally, the identifying and mapping module 31 is further configured to generate a performance indicator for the task type according to the task type when the scheduling policy is the performance indicator.

Figure 11:
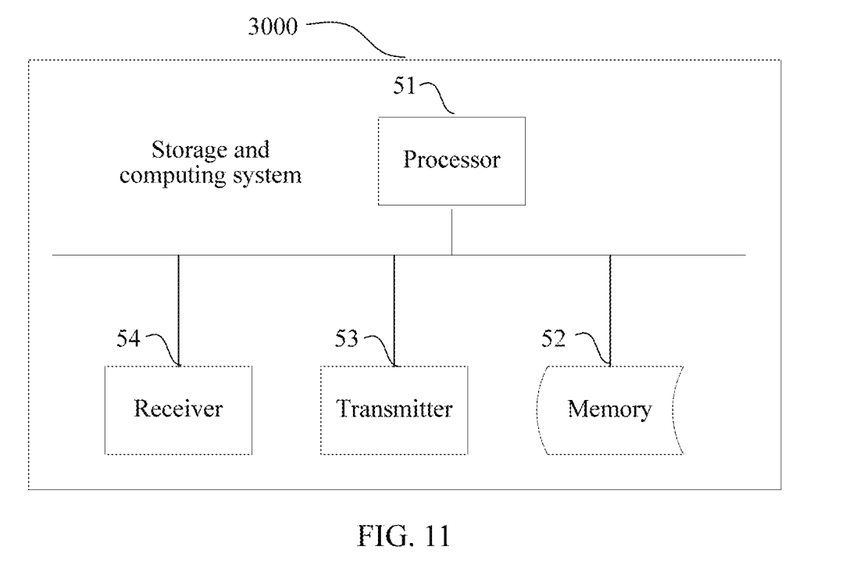
FIG. 11 is a schematic structural diagram of Embodiment 7 of a storage and computing system according to the present disclosure.

FIG. 11 is a schematic structural diagram of Embodiment 7 of a storage and computing system according to the present disclosure. As shown in FIG. 11, the storage and computing system 3000 provided in this embodiment includes a processor 51 and a memory 52. The storage and computing system 3000 may further include a transmitter 53 and a receiver 54. The transmitter 53 and the receiver 54 may be connected to the processor 51. The transmitter 53 is configured to send data or information. The receiver 54 is configured to receive the data or information. The memory 52 stores an execution instruction. The processor 51 communicates with the memory 52, and the processor 51 invokes the execution instruction in the memory 52, to execute method embodiments shown in FIG. 2 and FIG. 5 when the storage and computing system 3000 runs, where implementation principles and technical solutions thereof are similar, and details are not described herein again.

Figure 12:
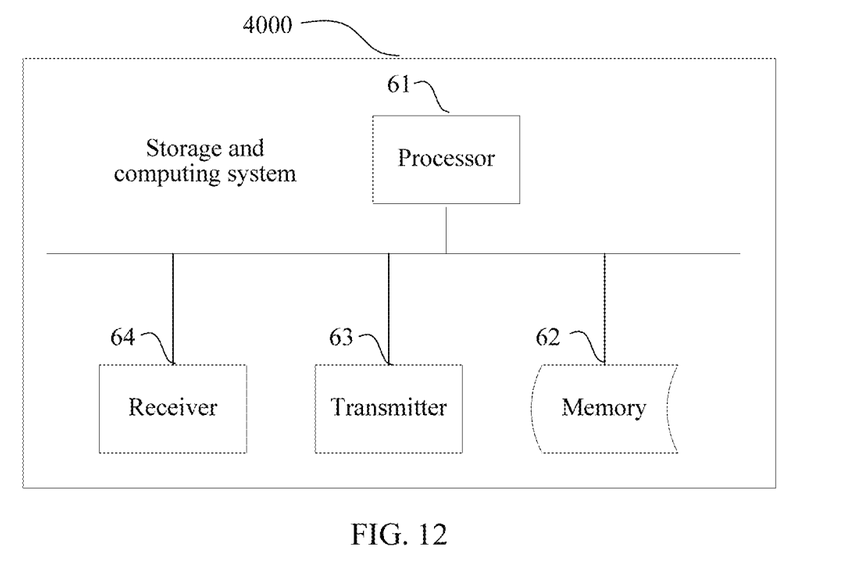
FIG. 12 is a schematic structural diagram of Embodiment 8 of a storage and computing system according to the present disclosure.

FIG. 12 is a schematic structural diagram of Embodiment 8 of a storage and computing system according to the present disclosure. As shown in FIG. 12, the storage and computing system 4000 provided in this embodiment includes a processor 61 and a memory 62. The storage and computing system 4000 may further include a transmitter 63 and a receiver 64. The transmitter 63 and the receiver 64 may be connected to the processor 61. The transmitter 63 is configured to send data or information. The receiver 64 is configured to receive the data or information. The memory 62 stores an execution instruction. The processor 61 communicates with the memory 62, and the processor 61 invokes the execution instruction in the memory 62, to execute method embodiments shown in FIG. 4 and FIG. 5 when the storage and computing system 4000 runs, where implementation principles and technical solutions thereof are similar, and details are not described herein again.

Persons of ordinary skill in the art may understand that all or a part of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random-access memory (RAM), a magnetic disc, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A storage resource scheduling method, wherein a computing system comprising at least one computing unit, a storage system comprising at least one storage unit, and the method comprising:
    identifying, by the computing system, a task type of an operating task of a computing unit in the at least one computing unit, the operating task including one of startup, restart, creation, deletion, migration, or wakeup of the computing unit;
    sending, by the computing system, task type information to the storage system, the task type information carrying the task type and a service level of the computing unit, the service level of the computing unit being one of high, medium, or low;
    determining, by the storage system according to the task type information, operation information corresponding to the task type, the operation information including a service level relationship between the service level of the computing unit and a storage service level of the task type, the storage service level indicating a level for processing order priority associated with the task type, the storage system being configured to store a correspondence between the task type and the storage service level;
    processing, by the storage system, the service level of the computing unit according to the operation information to acquire a scheduling policy of the task type, acquiring the scheduling policy of the task type comprising searching, by the storage system according to the task type information, the correspondence to determine the storage service level of the task type; and
    scheduling, by the storage system according to the scheduling policy, a storage unit corresponding to the computing unit.

2. The method according to claim 1, wherein the scheduling policy further corresponds to a performance indicator for the task type, and acquiring the scheduling policy of the task type comprising generating, by the storage system, the performance indicator for the task type according to the task type information.

3. The method according to claim 1, wherein before sending the task type information to the storage system, the method further comprises establishing, by the computing system, a communications interface between the computing system and the storage system, and sending the task type information to the storage system comprising sending, by the computing system, the task type information to the storage system using the communications interface.

4. The method according to claim 1, wherein before sending the task type information to the storage system, the method further comprises configuring, by the computing system, a configuration file for communication between the computing system and the storage system, and sending the task type information to the storage system comprising:
    adding, by the computing system, the task type information in the configuration file; and
    sending the configuration file to the storage system.

5. A storage resource scheduling method, wherein a computing system comprising at least one computing unit, a storage system comprising at least one storage unit, and the method comprising:
    identifying, by the computing system, a task type of an operating task of a computing unit in the at least one computing unit, the operating task including one of startup, restart, creation, deletion, migration, or wakeup of the computing unit;
    determining, by the computing system, operation information corresponding to the task type, the operation information including a relationship between a storage service level of the computing unit and a storage service level of the task type, the storage service level indicating a level for processing order priority associated with the task type, the computing system storing a correspondence between the task type and the storage service level, the storage service level of the computing unit being one of high, medium, or low;
    processing, according to the operation information, a service level of the computing unit to acquire a scheduling policy of the task type, acquiring the scheduling policy of the task type comprising searching, by the computing system according to the task type, the correspondence to determine the storage service level of the task type;
    sending, by the computing system, the scheduling policy of the task type to the storage system; and
    scheduling, by the storage system according to the scheduling policy, a storage unit corresponding to the computing unit.

6. The method according to claim 5, wherein the scheduling policy further corresponds to a performance indicator for the task type, and acquiring the scheduling policy of the task type comprising generating, by the computing system, the performance indicator for the task type according to the task type.

7. A computer program product, wherein a computing system comprising at least one computing unit, a storage system comprising at least one storage unit, the computer program product comprising a non-transitory computer-readable medium configured to store computer executable instructions, and the instructions comprising:

instructions for identifying, by the computing system, a task type of an operating task of a computing unit in the at least one computing unit, the operating task including one of startup, restart, creation, deletion, migration, or wakeup of the computing unit;

instructions for sending, by the computing system, task type information to the storage system, the task type information carrying the task type and a service level of the computing unit, the service level of the computing unit being one of high, medium, or low;

instructions for determining, by the storage system according to the task type information, operation information corresponding to the task type, the operation information including a relationship between a storage service level of the computing unit and a storage service level of the task type, the storage service level indicating a level for processing order priority associated with the task type, the storage system being configured to store a correspondence between the task type and the storage service level;

instructions for processing the service level of the computing unit according to the operation information to acquire a scheduling policy of the task type, acquiring the scheduling policy of the task type comprising searching, by the storage system according to the task type information, the correspondence to determine the storage service level of the task type; and instructions for scheduling, by the storage system according to the scheduling policy, a storage unit corresponding to the computing unit.

8. The computer program product according to claim 7, wherein the scheduling policy further corresponds to a performance indicator for the task type, and the instructions further comprising instructions for generating, by the storage system, the performance indicator for the task type according to the task type information.

9. The computer program product according to claim 7, wherein the instructions further comprise:

instructions for establishing, by the computing system, a communications interface between the computing system and the storage system; and instructions for sending, by the computing system, the task type information to the storage system using the communications interface.

10. The computer program product according to claim 7, wherein the instructions further comprise:

instructions for configuring, by the computing system, a configuration file for communication between the computing system and the storage system;

instructions for adding, by the computing system, the task type information in the configuration file; and instructions for sending, by the computing system, the configuration file to the storage system.

11. A computer program product, wherein a computing system comprises at least one computing unit, a storage system comprising at least one storage unit, the computer program product comprising a non-transitory computer-readable medium configured to store computer executable instructions, and the instructions comprising:

instructions for identifying, by the computing system, a task type of an operating task of a computing unit in the at least one computing unit, the operating task including one of startup, restart, creation, deletion, migration, or wakeup of the computing unit;

instructions for determining, by the computing system, operation information corresponding to the task type, the operation information including a relationship between a storage service level of the computing unit and a storage service level of the task type, the storage service level indicating a level for processing order priority associated with the task type, the computing system being configured to store a correspondence between the task type and the storage service level, the storage service level of the computing unit being one of high, medium, or low; and instructions for processing, according to the operation information, a service level of the computing unit to obtain a scheduling policy of the task type, acquiring the scheduling policy of the task type comprising searching, by the computing system according to the task type, the correspondence to determine the storage service level of the task type;

instructions for sending, by the computing system, the scheduling policy of the task type to the storage system; and instructions for scheduling, by the storage system according to the scheduling policy, a storage unit corresponding to the computing unit.

12. The computer program product according to claim 11, wherein the scheduling policy further corresponds to a performance indicator for the task type, and the instructions further comprising instructions for generating, by the computing system, the performance indicator for the task type according to the task type.

\* \* \* \* \*